US008007217B2

(12) United States Patent
Müller

(10) Patent No.: US 8,007,217 B2
(45) Date of Patent: Aug. 30, 2011

(54) ARRANGEMENT FOR THE BACKLINING OR THE HEADBANDING OF A BOOK BLOCK SPINE

(75) Inventor: Hans Müller, Lauda-Konigshofen (DE)

(73) Assignee: Mueller Martini Holding AG, Hergiswill (CH)

(*) Notice: Subject to any disclaimer, the term of this patent is extended or adjusted under 35 U.S.C. 154(b) by 940 days.

(21) Appl. No.: 11/896,374

(22) Filed: Aug. 31, 2007

(65) Prior Publication Data

US 2008/0056849 A1 Mar. 6, 2008

(30) Foreign Application Priority Data

Sep. 4, 2006 (EP) ..................................... 06405380

(51) Int. Cl.

| | |
|---|---|
| ***B42C 5/02*** | (2006.01) |
| ***B42C 9/02*** | (2006.01) |
| ***B42B 9/00*** | (2006.01) |
| *B29C 65/00* | (2006.01) |
| *B32B 37/00* | (2006.01) |
| *B32B 38/04* | (2006.01) |
| *B32B 38/10* | (2006.01) |

(52) U.S. Cl. .............. 412/30; 412/31; 412/16; 156/510; 156/538

(58) Field of Classification Search .................. 412/4–5, 412/8, 16, 18–19, 21, 26–27, 30–31, 36; 156/510, 521, 538

See application file for complete search history.

(56) References Cited

U.S. PATENT DOCUMENTS

| | | | | |
|---|---|---|---|---|
| 982,438 | A * | 1/1911 | Murray | 412/30 |
| 1,865,557 | A * | 7/1932 | Clark | 412/27 |
| 2,646,104 | A * | 7/1953 | Hawkes | 412/27 |
| 3,911,517 | A * | 10/1975 | Davis | 412/27 |
| 3,920,501 | A * | 11/1975 | Carlton et al. | 412/16 |
| 4,149,289 | A * | 4/1979 | Sahlin | 412/1 |
| 4,166,300 | A * | 9/1979 | Savich | 412/31 |
| 4,281,854 | A * | 8/1981 | Savich | 412/31 |
| 4,898,506 | A * | 2/1990 | Lazar | 412/8 |
| 5,536,044 | A * | 7/1996 | Luhman et al. | 281/40 |
| 5,558,744 | A * | 9/1996 | Rock et al. | 156/522 |
| 6,726,423 | B2 * | 4/2004 | Hocking | 412/36 |
| 6,736,388 | B2 * | 5/2004 | Lawrence | 412/36 |

FOREIGN PATENT DOCUMENTS

DE 199 59 935 A1 6/2001

OTHER PUBLICATIONS

European Search Report dated May 21, 2007.

* cited by examiner

*Primary Examiner* — Shelley Self
*Assistant Examiner* — Kyle Grabowski
(74) *Attorney, Agent, or Firm* — Venable LLP; Robert Kinberg; Steven J. Schwarz

(57) ABSTRACT

An arrangement performs backlining or headbanding of a spine of a book block conveyed on a conveying section of a book production line through a backlining station. A feeding device feeds backlining material in a transfer direction perpendicular to a book block conveying direction. A unit includes a cross cutter to cut the backlining material into backlining sections, a transfer mechanism to transfer the backlining sections onto the book block spine, and a support table to support the backlining section being transferred onto the book block spine. A guide element is disposed above and at a distance to a book block spine in a production position, which guide element is advanced to bridge the book production line to transfer the backlining material through the book production line to allow at least one of outfitting or retrofitting of the backlining station.

8 Claims, 5 Drawing Sheets

Figúre 3

ARRANGEMENT FOR THE BACKLINING OR THE HEADBANDING OF A BOOK BLOCK SPINE

CROSS-REFERENCE TO RELATED APPLICATION

This application claims the priority of European Patent Application No. EP 06405380, filed on Sep. 4, 2006, the subject matter of which is incorporated herein by reference in its entirety.

BACKGROUND

The present invention relates to an arrangement for the backlining or headbanding of the spine of a book block, moving past a backlining station while positioned on a conveying section of a book production line. The arrangement typically includes a device for feeding the backlining material in a direction perpendicular to the book production line from a storage area to the book production line. A unit including a cross cutter and a transfer mechanism is installed downstream of the feeding device and serves to cut the material web into backlining sections that are transferred to the book block spine, wherein a supporting table is also assigned to this unit for supporting the backlining sections cut from the material web.

The backlining material on a book block spine helps reinforce and stabilize the book block spine.

During the operation of affixing headbands, at least one headband is glued to the backlining material prior to the processing, which enhances the look of the top edge and the bottom edge of a cased-in book block.

German Patent Document 199 59 935 describes a method and an arrangement for the treatment with gas and the backlining of book blocks.

Production lines for producing hardcover books exist, that are provided with two successively arranged stations of the above-described type for affixing headbands, or which have one headbanding station that can be supplemented with an additional headbanding station to prevent frequent interruptions in the book production caused by the retrofitting of a headbanding station. As known, book-production lines having even two headbanding stations cannot be retrofitted or outfitted for a new production order of a different format size without interrupting the operation because the existing feeding device does not allow for this.

SUMMARY

It is therefore an object of the present invention to provide a headbanding station, which can be outfitted for a new production order and/or which can be retrofitted during the course of a book production on a book-production line, so that the production of the books is not interrupted because of insufficient feeding of the backlining material.

The above object and other objects are accomplished according to the invention, which in one embodiment includes an arrangement for at least one of backlining or headbanding of a spine of a book block conveyed on a conveying section of a book production line through a backlining station, including: a feeding device to feed backlining material in a transfer direction perpendicular to a book block conveying direction; a unit including: a cross cutter to cut the backlining material into backlining sections, a transfer mechanism to transfer the backlining sections onto the book block spine, and a support table to support the backlining section being transferred onto the book block spine; and a guide element disposed above and at a distance to the book block spine in a production position, which guide element is advanced to bridge the book production line to transfer the backlining material through the book production line to allow at least one of outfitting or retrofitting of the backlining station.

As a result, it is possible to outfit and/or retrofit a headbanding station while avoiding an interruption in the production.

It is advantageous if two successively arranged headbanding stations are provided in book block conveying direction. This can be achieved by providing a book production line with two headbanding stations, arranged one after another in conveying direction of the book blocks.

For the operation of outfitting or retrofitting a headbanding station during a book production, the unit including a cross cutter, a transfer mechanism, and a support table can be raised from the operating position.

It has proven advantageous if the guide element used for outfitting and/or retrofitting a headbanding station can be raised together with the unit from a resting position, in which production is possible, to an operating position, so that the headbanding station can be outfitted and/or retrofitted during the course of the production.

To optimize the use of space, it is proposed that the guide element be moved to the operating position by moving it from a side of the book production line conveying section that is opposite the feeding device toward the direction for feeding the backlining material.

Alternatively, the guide element can also be adjusted with a guide arrangement at a right angle, relative to the book production line, so as to result in a displacement movement.

In place of a displacement movement, the guide element could also be pivoted around a pivoting axis that extends parallel to the conveying direction of the book blocks, wherein the pivoting axis is arranged at the back end of the guide element, as seen in feeding direction for the backlining material. This arrangement does not necessarily require the guide element to be connected to the unit, such that they can be raised jointly.

The function of the pivoting guide element can advantageously be supported by designing the guide element to bridge the book production line in the manner of an arch.

The arched guide element may be advanced by displacing it either transverse to or in conveying direction of the book blocks.

For a trouble-free transfer of the backlining material, it should furthermore be taken into consideration that the forward end of the guide element, as seen in transfer direction for the backlining material, is arranged below the discharge table in the operating position.

BRIEF DESCRIPTION OF THE DRAWINGS

These and other features and advantages of the invention will be further understood from the following detailed description of the preferred embodiments with reference to the accompanying drawings, which show in.

DETAILED DESCRIPTION

Figure 1:
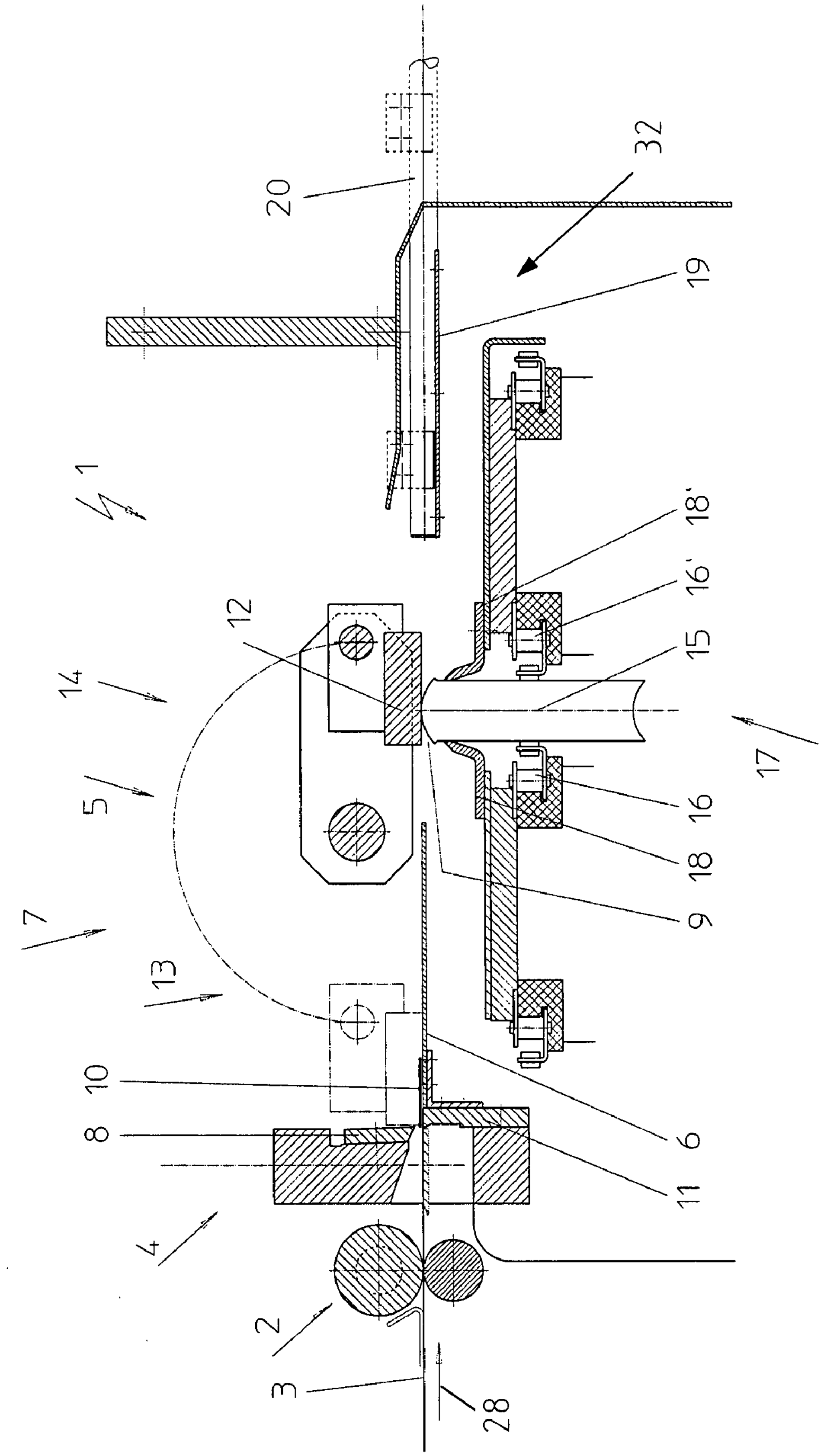
FIG. 1 A cross section of a book production line, showing the backlining station in the operating position.

FIG. 1 shows a cross section of a book production line in the region of a backlining station, comprising an arrangement 1 for backlining or headbanding a book block spine. A feeding device 2, which conveys in a direction 28 perpendicular to a book production line supplies backlining material 3 from a storage area (not shown) to a unit 7. The unit 7 includes a cross cutter 4, a transfer mechanism 5, and a support table 6. The web-shaped backlining material 3 is cut ahead of time into backlining material sections 10 of a required length, for example, with a circular blade, and is provided with headbands. More specifically, the backlining material 3 is moved forward by the feeding device 2 by a width measure that is adjusted to a size of a book block spine 9, and is positioned underneath an upper knife 8 of the cross cutter 4 in a raised position. The upper knife 8 is lowered to cut the backlining section 10. The backlining section 10 of the backlining material 3 is moved forward, and comes to rest on the support table 6, which is adjacent to a lower knife 11 of the cross cutter 4.

A suction plate 12 of the transfer mechanism 5 is aligned substantially parallel to the support table 6 and movable with a pivoting movement to a takeover position 13 and a discharge position 14. Before the cross cutter 4 cuts off the backlining section 10 from the backlining material 3 by lowering the upper knife 8, the suction plate 12 of the transfer mechanism 5 is pivoted into the takeover position 13. The backlining section 10 is clamped in between the suction plate 12 and the support table 6. Once the cut is completed, the suction plate 12 exerts suction on the backlining section 10 and transports the backlining section 10 with the pivoting movement to the discharge position 14. Successively following one another, upright positioned book blocks 15 are supplied with two opposite-arranged, circulating conveying chains 16, 16' to a conveyor 17 of the backlining station and are aligned and supported by guides 18, 18' on the sides.

While positioned in the discharge position 14 of the transfer mechanism 5, the suction plate 12 places the backlining section 10 over the book block spine 9, which is covered ahead of time with adhesive, and is pivoted back to the takeover position 13 for taking over the next backlining section 10 in the same manner. In a station that is arranged downstream of the backlining station, the backlining sections 10 that have been placed over the spines 9 of the book blocks 15 are pressed evenly and with the complete surface against the adhesive-covered book block spines 9 by using a Teflon band, a flexible pillow, e.g., made of a foam material, or with rollers.

A horizontally displaceable guide element 19, which is arranged on a side 32 of the conveying section 17 that is opposite the feeding device 2, and which is connected to one or more lifting devices 20, e.g., pneumatic cylinders, is shown in the idle position according to FIG. 1.

Figure 2:
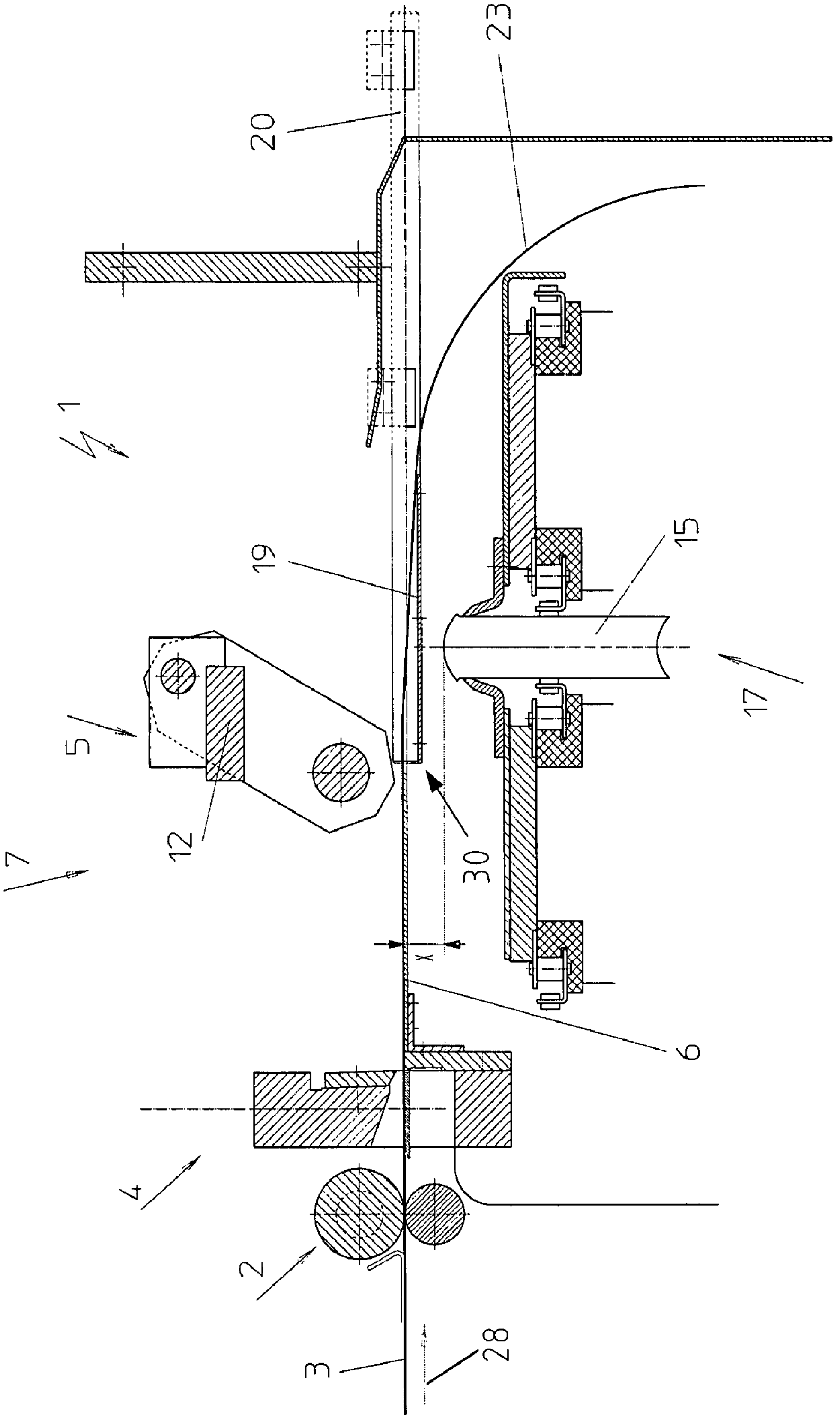
FIG. 2 A representation according to FIG. 1, for which the backlining station is in the position where it is outfitted and/or retrofitted.

FIG. 2 shows a representation where the backlining station is in an outfitting or retrofitting position. The unit 7, including the cross cutter 4, the transfer mechanism 5, and the support table 6, is raised up for this operation by a distance X from the production position shown in FIG. 1. The guide element 19 has been moved by the lifting device 20 from the idle position to an operating position, so that the guide element 19 rests against the support table 6. A forward or front edge 30 of the guide element 19, as seen in transfer direction of the backlining material 3, comes to rest below the support table 6. The transfer mechanism 5 is in a position in which the suction plate 12 is raised from the support table 6 and is located between the takeover position 13 and the discharge position 14 (shown in FIG. 1). The arrangement shown in FIG. 2 makes it possible to push the backlining material 3, which is conveyed by the feeding device 2 through the stationary cross cutter 4, across the book blocks 15 positioned on the conveying section 17, which pass through below the guide element 19 during the outfitting and/or retrofitting operation.

Figure 3:
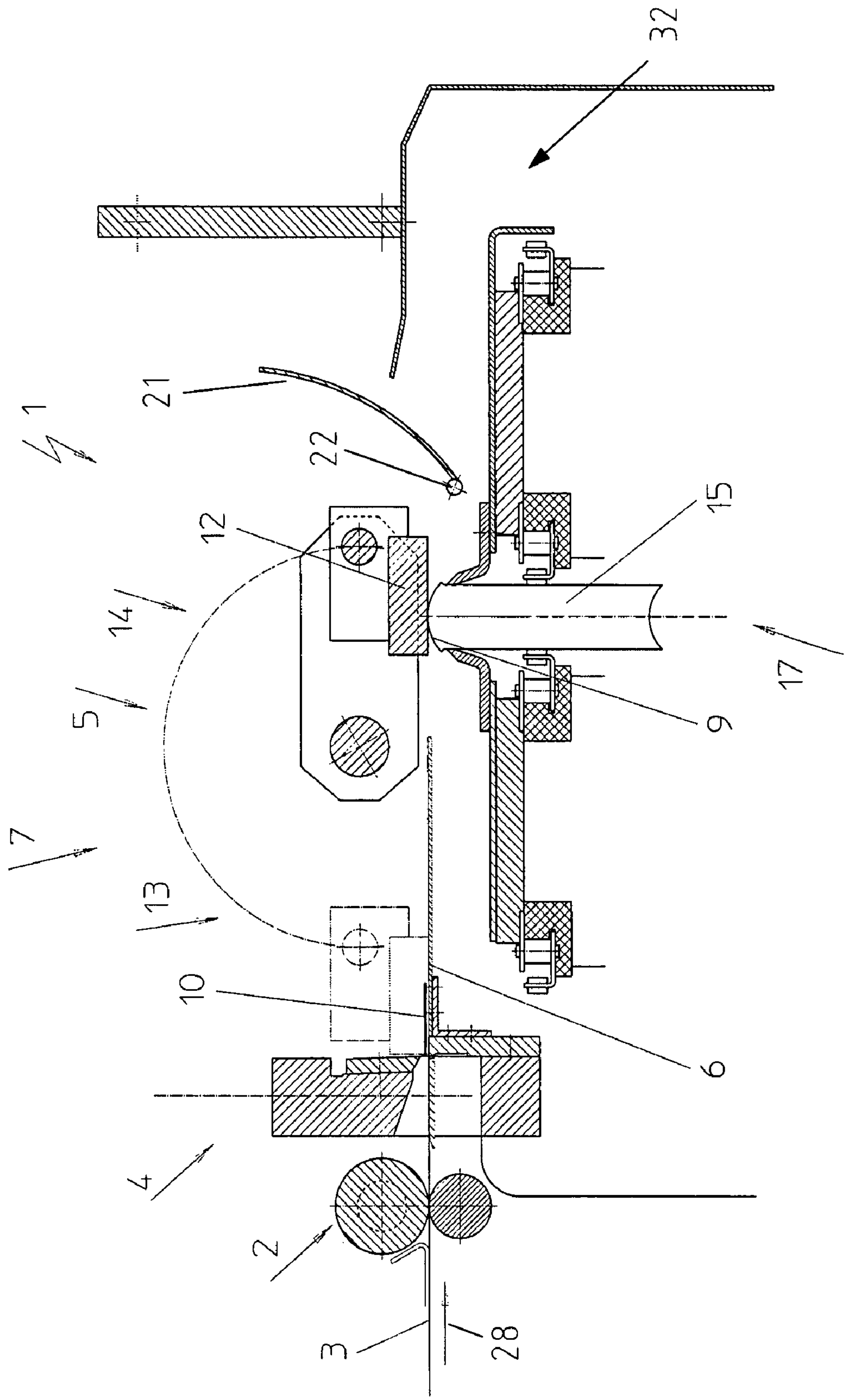
FIG. 3 A cross section of a book production line showing an alternative backlining station in the production position.

Similarly to FIG. 1, FIG. 3 shows a cross section through a backlining station of a book production line in the production position, that is provided with an alternative, pivotable guide element 21 which is pivotable around a pivoting axis 22 arranged substantially parallel to a direction of conveying the book blocks 15 at one end of the guide element 21. With the suction plate 12 on the transfer mechanism 5, the backlining sections 10 are moved from the support table 6 onto the adhesive-covered book block spines 9, as described above.

Figure 4:
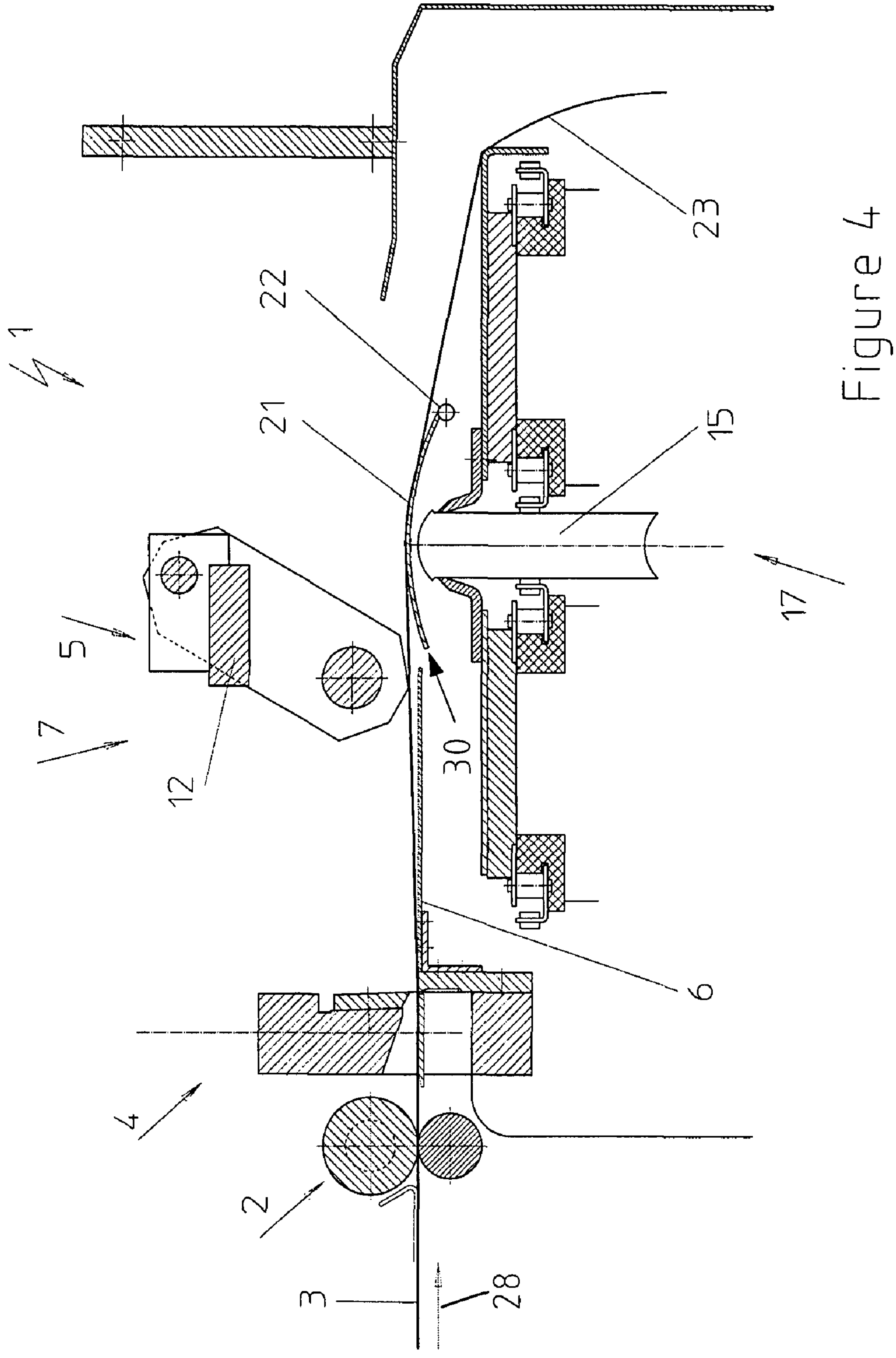
FIG. 4 A representation according to FIG. 3, for which the backlining station is in the position where it is outfitted and/or retrofitted.

FIG. 4 shows a representation of the outfitting and/or retrofitting position, with the pivoting guide element 21, which is in the operating position and thus bridges the book production line in the manner of an arch. The front end 30 of the pivoting guide element 21, as seen in conveying direction 28 of the backlining material 3 is positioned lower than the support table 6.

During the changeover of the backlining station from the outfitting and/or retrofitting position, as shown in FIGS. 2 and 4, back to the production position shown in FIGS. 1 and 3, a web section 23 of the backlining material 3 that is held by the feeding device 2 and is connected to the storage area is cut off by the cross cutter 4. Experience has shown that for the web section 23 to drop across the conveyor 17 and down, as a result of its own weight, this web section must have a specific length.

Figure 5:
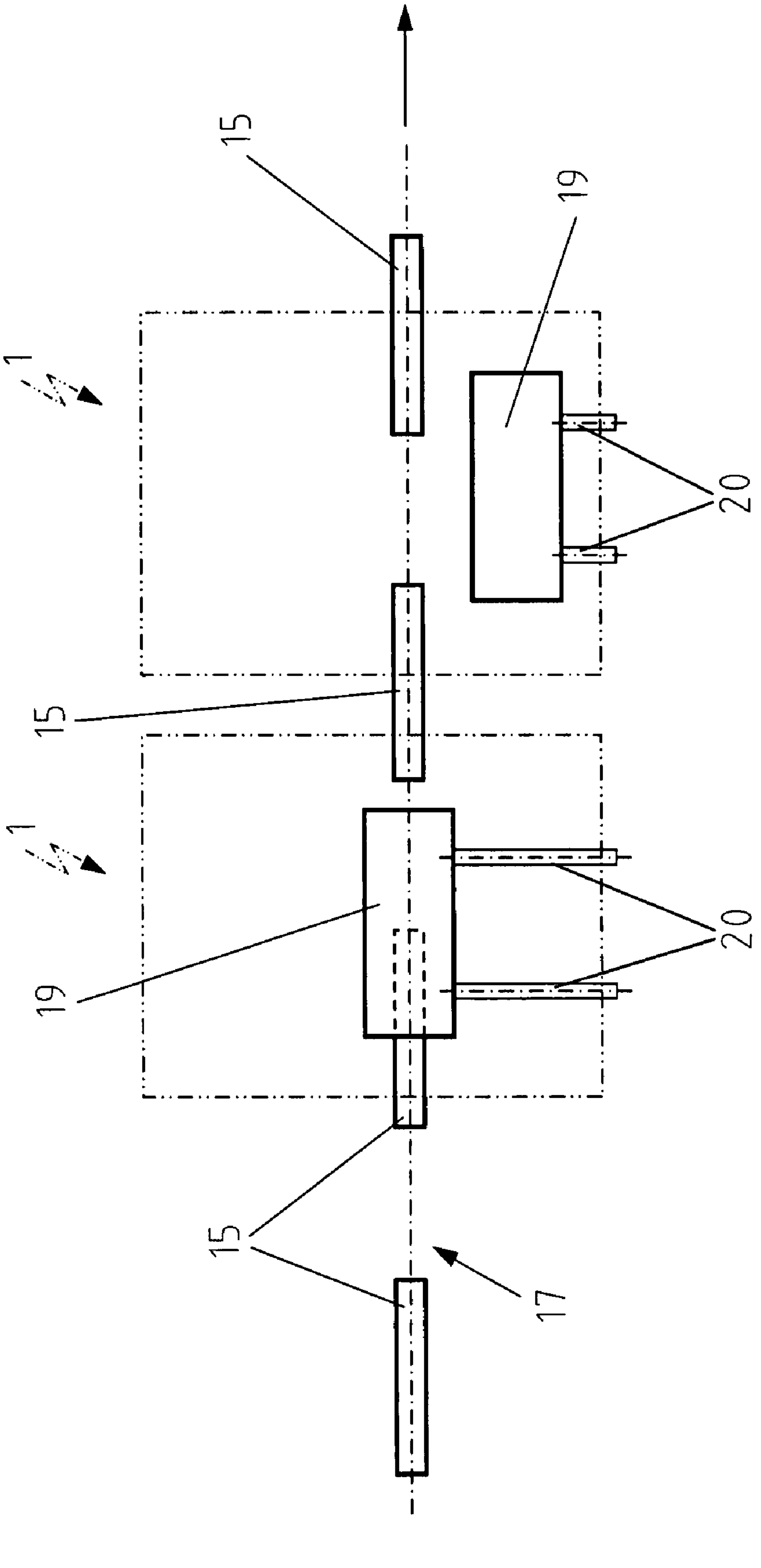
FIG. 5 A top view of a book production line with two backlining stations arranged one after another.

FIG. 5 shows a section of a book production line with two backlining stations arranged one after another in the book block conveying direction. The first backlining station on the left is in the operating position as shown in FIG. 2. The second backlining station on the right is in the outfitting and/or retrofitting position according to FIG. 1.

It will be understood that the above description of the present invention is susceptible to various modifications, changes and adaptations, and that the same are intended to be comprehended within the meaning and range of equivalents of the appended claims.

What is claimed is:

1. An arrangement for at least one of backlining or headbanding of a spine of a book block conveyed on a conveying section of a book production line through a backlining station or a headbanding station comprising:

a feeding device to feed backlining material in a transfer direction perpendicular to a book block conveying direction;

a unit comprising:

a cross cutter to cut the backlining material into backlining sections, a transfer mechanism to transfer the backlining sections onto the book block spine, and a support table to support the backlining section being transferred onto the book block spine; and a guide element disposed above and at a distance to the book block spine in a production position, which guide element is advanced to bridge the book production line to transfer the backlining material wherein, during at least one of outfitting or retrofitting of the backlining station or the headbanding station, the unit is raised up from the production position in respect to the book block by a distance X.

2. The arrangement according to claim 1, including:

two headbanding stations arranged one after another in the book block conveying direction.

3. The arrangement according to claim 1, wherein the guide element is connected to the unit and is raised simultaneously with the unit.

4. The arrangement according to claim 1, wherein the guide element is displaced from a side of the conveying section that is opposite the feeding device to the bridge position.

5. The arrangement according to claim 4, further including:

a guide arrangement to adjust the guide element to be at a right angle relative to the conveying direction of the book block.

6. The arrangement according to claim 4, wherein the guide element is pivoted around an axis that is positioned substantially parallel to the conveying direction of the book block.

7. The arrangement according to claim 6, wherein the guide element bridges the book production line as an arch.

8. The arrangement according to claim 1, wherein the guide element includes:

a forward edge arranged below the support table for the bridge position.

* * * * *